Jan. 20, 1959     V. I. MEIER     2,869,208
QUICK RELEASE MECHANISM
Filed Nov. 17, 1953
*Fig. 1*
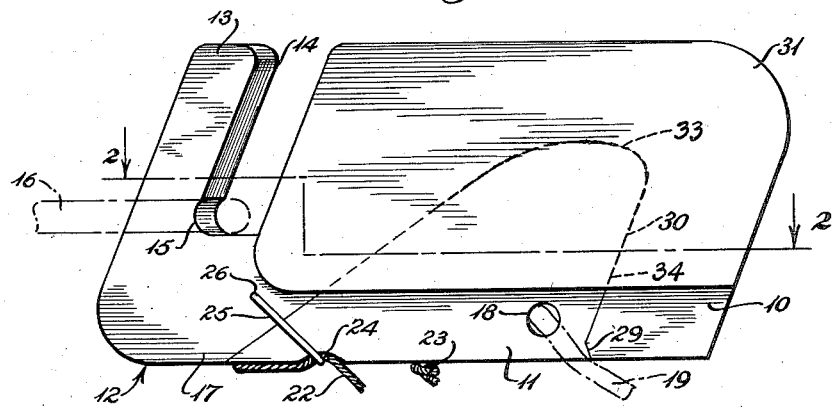
*Fig. 2*
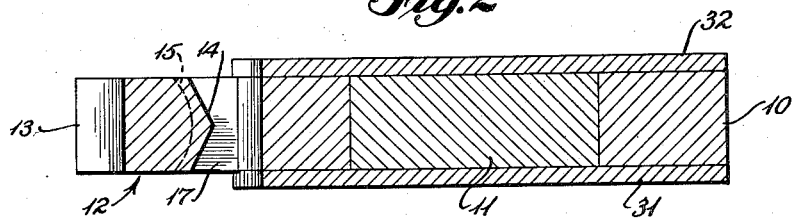
*Fig. 4*     *Fig. 3*
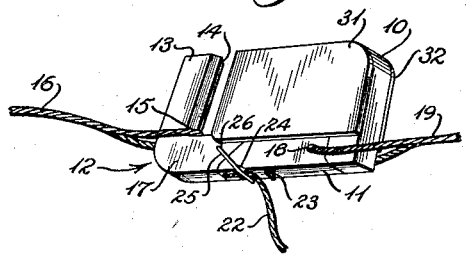 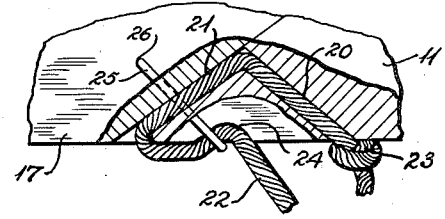
*Fig. 5*
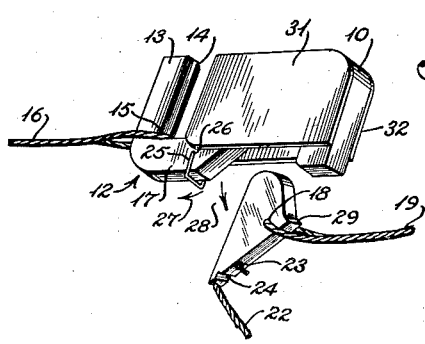
INVENTOR
Vincent I. Meier
BY
ATTORNEYS

United States Patent Office 2,869,208
Patented Jan. 20, 1959

2,869,208

QUICK RELEASE MECHANISM

Vincent I. Meier, Port Washington, N. Y., assignor to the United States of America as represented by the Secretary of the Navy Application November 17, 1953, Serial No. 392,781

4 Claims. (Cl. 24—230)

This invention relates to a mechanism which provides for the quick release of lines which are joined under tension.

The invention finds particular application by providing a mechanism for quickly releasing lines used to secure the covers or protectors to the wing or tail surface of an aircraft. The invention may also be employed by ganging a series of such mechanisms together and thus releasing any number of lines simultaneously.

It is an object of this invention to provide a simple, but reliable mechanism for securing two lines, and which enables the quick and easy release of said lines when under tension.

It is a further object of this invention to provide a quick release mechanism employing an eccentric motion to free two lines.

Still another object of this invention is to provide the quick release of two lines by the use of an eccentrically rotatable segment secured within a cavity of a block and to provide a simple means for quickly removing the segment from the block.

A further object of this invention is the provision of a quick release mechanism for a pair of joined lines under tension wherein each of said lines is secured, respectively, to a block having a segment cut therefrom and to the segment, wherein said parts, when secured, join said lines, and means for removing the segment from the block including means for eccentrically rotating said segment.

Further objects and advantages of this invention will become apparent from the following description and claims, and the accompanying drawing, in which:

Fig. 1 is a side view of a preferred form of the quick release mechanism;

Fig. 2 is a cross-sectional view of Fig. 1 along the line 2—2 of Fig. 1;

Fig. 3 is an enlarged detail view showing the line locking arrangement;

Fig. 4 is a isometric view showing the mechanism in its locked position; and

Fig. 5 is a view showing the mechanism in its unlocked position.

Referring to the drawing, it is seen that the device consists of a block 10 from which a segment 11 has been cut. A hook section 12 integral with the block 10, is also provided. The elements 10, 11 and 12 may be made from wood, steel, or any other material of sufficient strength to withstand the pressures to be applied. The hook section 12 consists of a leg 13 having an upper bevelled portion 14 and a lower recessed portion 15. A line 16 is looped over the leg 13, as shown, and is securely retained under tension within the recess 15. The hook section 12 is made integral with the block 10 by means of the leg 17. The segment 11 is provided with a transverse hole 18, through which a second line 19 is passed and secured.

The segment 11, as most clearly shown in Fig. 3, is provided with a drilled hole 20 and a recess 21. A trip line 22 is passed through the hole 20 and rests within the recess 21 as shown. The trip line 23 is secured at one end by any suitable means, such as a knot 23, and the bottom portion of the segment 11 is provided with a detent 24, for purposes to be hereinafter described.

A simple latching member, such as a spring latch 25 is pivotally mounted, as shown, on the block 10 within the transverse hole 26. When the mechanism is in its locked position, as shown in Figs. 3 and 4, the latch 25 engages and locks the trip line 22 within the detent 24. In order to unlock the mechanism, the trip line 22 is jerked or pulled, thereby rotating the latch 25 in the direction shown by the arrow 27 in Fig. 5. At the same time, the section 11 is also rotated in the direction shown by the arrow 28.

The rotation of the segment 11 is produced by the pulling action of the trip line. A projection 29 on the segment 11 provides a pivot point. In the embodiment shown, the segment 11 was cut from the block 10 with said segment comprising a first portion 33 having an increasing radius from the projection 29 and a second portion 34 contiguous to the first portion at an oblique angle to the projection 29. Said first portion 33 and second portion 34 meet at a junction indicated at 30, Fig. 1.

When the trip line is pulled, the segment 11 rotates until the hole 18 in the section 11 is below the projection 29, about which rotation takes place. At this point, tension on the line 19 tends to continue rotation of the segment 11 and thus frees the segment from the cavity in the block, thereby releasing the block 10 and the segment 11, and thus releasing the lines 16 and 19.

The exact shape of the segment 11 is not critical. The shape of the segment 11 must merely be such that it will operate as an eccentric so that rotation is first produced by tension on the lines 22 and then by tension on line 19. From the shape of the segment 11, it is clear that no rotation of the segment will result from tension on line 19 until after the latch 25 has been released from detent 24, and until after the segment 11 has been rotated to a position where the hole 18 is below the projection at 29.

To prevent the segment 11 from accidently falling out of the block 10, side walls 31 and 32 have been provided. These walls may be secured in any convenient manner, or may be integral with the block 10, depending on the method of manufacture of the mechanism.

Although it has not been illustrated, it is clear that tripping line 22 may conveniently be ganged with a plurality of tripping lines of other similar devices, thereby facilitating the simultaneous release of a plurality of lines with one motion. Furthermore, by varying the shape of the segment 11, virtually any number of trip line pull vs. securing line pull combinations are readily available.

While a preferred embodiment of the invention has been shown and described, it will be apparent to those skilled in the art that changes and modifications may be made without departing from the spirit of the invention in its broader aspects, and, therefore, it is intended that all matter contained in the above description and drawings be interpreted as illustrative, and not in a limiting sense.

What is claimed is:

1. A quick release mechanism for a pair of joined members under tension comprising a body and a segment cut therefrom to provide a cavity, said segment being retainable in said cavity to completely fill the same and being separable from said body, the periphery of said segment comprising first and second contiguous portions meeting at a junction and adapted to be in contact with the wall of said cavity, and a pivot point adjacent said second portion, the distance from said junction to said pivot point being no greater than the distance from any point on the periphery of said first portion to said pivot point, and the distance from any point on said second portion to said pivot point being no greater than said first mentioned distance; a first of said members connected to said body; a second of said members connected to said segment and permanently secured thereto; a latch pivotally securing said segment within said cavity; and means for simultaneously releasing said latch and for pivoting said segment within said cavity about said pivot point whereby said segment, upon pivoting, may separate from said body to release said members.

2. The invention as defined in claim 1 wherein said members are lines.

3. The invention as defined in claim 1 wherein said second of said members is connected to said segment at a point adjacent said second portion and above said pivot point, whereby the tension on said second member will tend to restrain rotation of said segment.

4. A quick release mechanism for a pair of joined members under tension comprising a body and a segment cut therefrom to provide a cavity, said segment being retainable in said cavity to completely fill the same and being separable from said body, the periphery of said segment comprising first and second contiguous portions meeting at a junction and adapted to be in contact with the wall of said cavity, and a pivot point adjacent said second portion, the distance from said junction to said pivot point being no greater than the distance from any point on the periphery of said first portion to said pivot point, and the distance from any point on said second portion to said pivot point being no greater than said first mentioned distance; a first of said members connected to said body; a second of said members connected to said segment and permanently secured thereto at a point adjacent said second portion and above said pivot point, whereby rotation of said segment is restrained, and means adjacent said first portion for rotating said segment about said pivot point.

References Cited in the file of this patent

UNITED STATES PATENTS

| | | |
|---|---|---|
| 259,841 | France | June 20, 1882 |
| 521,293 | Moore | June 12, 1894 |
| 1,193,135 | Gerstner et al. | Aug. 1, 1916 |
| 1,559,959 | Haynes | Nov. 3, 1925 |
| 1,751,309 | De Mone | Mar. 18, 1930 |
| 1,875,262 | Reyburn | Aug. 30, 1932 |

FOREIGN PATENTS

| | | |
|---|---|---|
| 16,155 | Denmark | July 8, 1912 |